Figure 1:
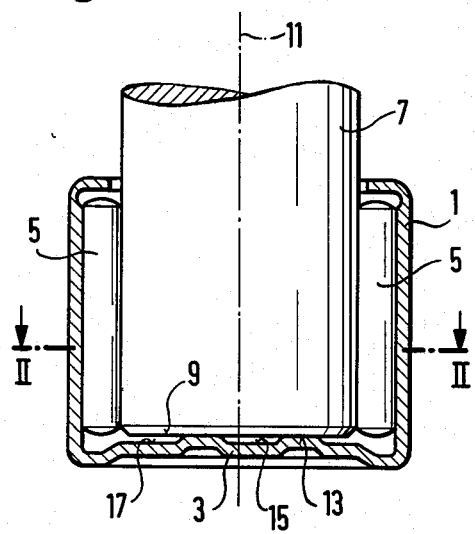

_United States Patent_ [19]

Eckhardt

[11] 3,920,296

[45] Nov. 18, 1975

[54] JOURNAL BEARING
[75] Inventor: Hellmuth Eckhardt, Herzogenrath, Germany
[73] Assignee: Torrington GmbH, Wurselen, Germany
[22] Filed: Mar. 11, 1974
[21] Appl. No.: 449,961

[30] Foreign Application Priority Data
Mar. 17, 1973 Germany............................ 7310156

[52] U.S. Cl................................ 308/212; 308/163
[51] Int. Cl.²....................................... F16C 13/00
[58] Field of Search ........... 308/186, 160, 187, 212, 308/213, 214, 79, 172, 92, 95, 106, 114, 121; 29/84, 148.4

[56] References Cited
UNITED STATES PATENTS
2,063,787  12/1936  Brown................................. 308/212
2,976,091  3/1961  Miller, Jr............................ 308/212
3,020,110  2/1962  Kleinshmidt........................ 308/163
3,397,332  8/1968  Pitner.................................. 308/212
3,580,170  5/1971  Furman................................ 308/212

_Primary Examiner_—Leo Friaglia
_Assistant Examiner_—Richard A. Bertsch
_Attorney, Agent, or Firm_—Frank S. Troidl

[57] ABSTRACT

This invention is a new bearing for receiving a journal. The journal extends into the bearing cup. The cup has a closed bottom with a recess formed in the closed bottom eccentric relative to the axis of the bearing. The recess may be formed by an annular journal contacting surface projecting inwardly from the closed bottom of the bearing cup.

5 Claims, 2 Drawing Figures

JOURNAL BEARING

This invention relates to journal bearings. More particularly, this invention is an improved bearing cup.

In order to minimize frictional force and the friction torque caused by the rotation of a journal in a bearing, some currently used bearings are provided with a bearing cup with a journal contacting surface having the same axis as the bearing cup. Examples of such currently used bearings are shown in German Offenlegungsschrift 2,120,569 and German Offenlegungsschrift 2,122,575.

A journal contacting surface with a central curvature or bulge extending inwardly from the bearing cup bottom is shown in German Offenlegungsschrift 2,122,575. A journal contacting surface with a central curvature or bulge extending outwardly from the bearing cup bottom is shown in German Offenlegungsschrift 2,120,569. The frictional force occuring between the journal contacting surfaces of the bearing and the journal produce undue friction torque. It is highly desirable to minimize such frictional force.

This invention reduces the friction torque and improves the lubrication between the end of the journal and the bearing cup bottom.

Briefly described, this invention comprises a bearing cup having a closed bottom for the end of the journal to abut against. A recess is formed in the closed bottom. The recess is eccentric relative to the axis of the bearing. This construction makes it possible to make the contacting surface small enough to cause only a minor friction torque. The eccentric recess insures that the lubricant is well distributed between the end of the journal and the bearing cup bottom while the journal rotates in the bearing.

In a preferred embodiment of the invention, radially extending grooves are provided in the eccentric journal contacting surface. The radially extending grooves and the inwardly projecting journal contacting surface provide an area between the journal contacting surface and the bearing cup wall so that the lubricant can be virtually pumped between the recess and the outside wall of the bearing cup when the journal rotates in the bearing.

Figure 2:
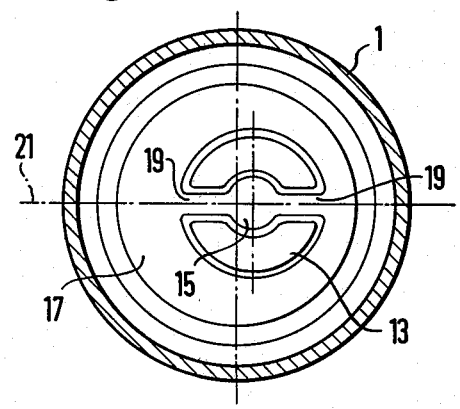

The invention, as well at its many advantages, may be further understood by reference to the following detailed description and drawings in which:

FIG. 1 is a view, partly in section, through a bearing including a journal mounted for rotation in the bearing; and FIG. 2 is a view taken along lines II—II of FIG. 1 with the journal removed and the bearing cup rotated 90°.

The bearing has the shape shown in FIGS. 1 and 2. The bearing includes a bearing cup 1 having a closed bottom 3. The end of a journal 7 is supported within the bearing by means of roller members 5 for example needles. The end 9 of the journal 7 rests on the cup bottom 3. The number 11 refers to the common axis of the journal 7 and the bearing 1.

The recess 15 may be formed by a substantially annular journal contacting surface 13 projecting inwardly from the closed bottom 3 of the bearing cup. The end of the journal 7 contacts only that surface of the bearing cup bottom consisting of the substantially annular surface 13. Surface 13 is eccentrically arranged relative to the axis 11. Therefore, recess 15 is also eccentric relative to the axis 11.

The area 17 of the bearing cup bottom 3 located between the outside of substantially annular surface 13 and the side of the cup bearing will not contact the end surface 9 of the journal 7 in any of the conditions of operation or during assembling work. The recess 15 and the area 17 between the cup bearing bottom 3 and the end 9 of the journal 7 serve to receive the lubricant.

As shown in FIG. 2, radially extending grooves 19 are provided in the journal contacting surface 13. The bottom surface of the grooves 19 are on the same level as the bottom surfaces of the recess 15 and the area 17. The grooves 19 may be spaced apart by 180 degrees and be located on a plain extending in the direction of eccentricity, as shown in FIG. 2.

The bearing of this invention may be used especially for supporting journals of universal joints in the construction of vehicles such as for the universal joint shaft of a vehicle steering system. Also, the invention is not limited to a bearing having roller members. It may also be used as a plain or slide bearing bushing.

The size of the annular surface 13 depends on the thrust load occuring in the operation and on rotational speed. However, the substantially annular surface 13 can be dimensioned so small and/or arranged so closed to the axis that in spite of its eccentricity, there will not be caused any substantially abstructive, friction torques.

It is advantageous, though not necessary, to inwardly depress the whole of the bearing cup bottom 3 relative to the bottom edge of the bearing cup 1, as shown in FIG. 1.

The term "annular journal contacting surface" as used in some of the claims is meant to include a completely annular journal contacting surface as well as the substantially annular contacting surface shown in the drawings.

I claim:

1. A bearing for receiving a journal comprising: a bearing cup having a closed bottom for the end of the journal to abut against, and a projection formed in the closed bottom eccentrically relative to the axis of the bearing.

2. A bearing in accordance with claim 1 wherein the projection is formed by an annular journal contacting surface projecting inwardly from the closed bottom of the bearing cup.

3. A bearing in accordance with claim 2 wherein radially extending grooves are provided in the journal contacting surface.

4. A bearing in accordance with claim 3 wherein the radially extending grooves are spaced apart by 180°.

5. A bearing in accordance with claim 4 wherein the radially extending grooves are on a plane extending in the direction of eccentricity.

* * * * *